I. A. DAVIS.
LOCOMOTIVE ASH PAN.
APPLICATION FILED FEB. 20, 1911.
1,003,992.
Patented Sept. 26, 1911.
2 SHEETS—SHEET 1.
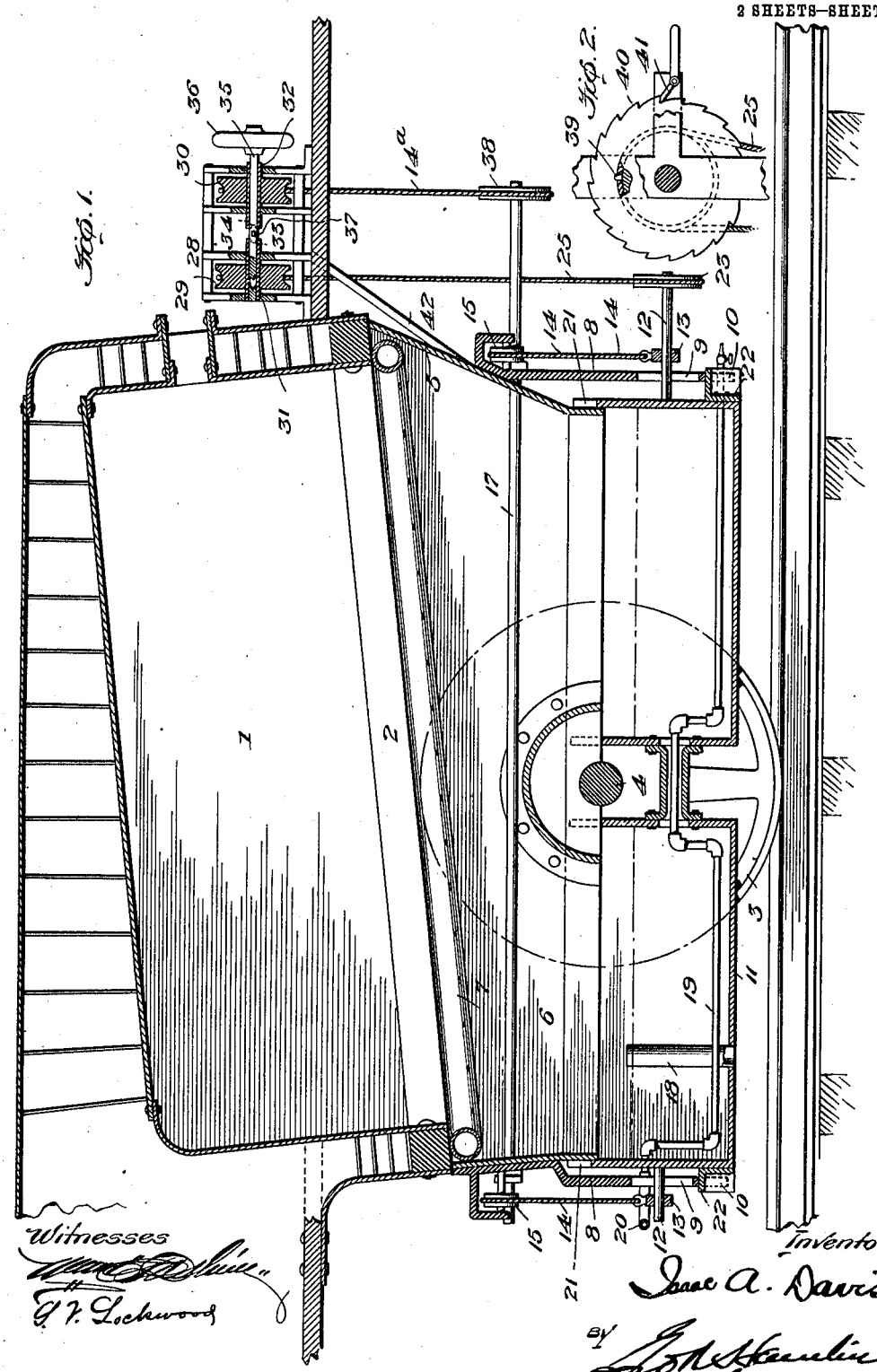

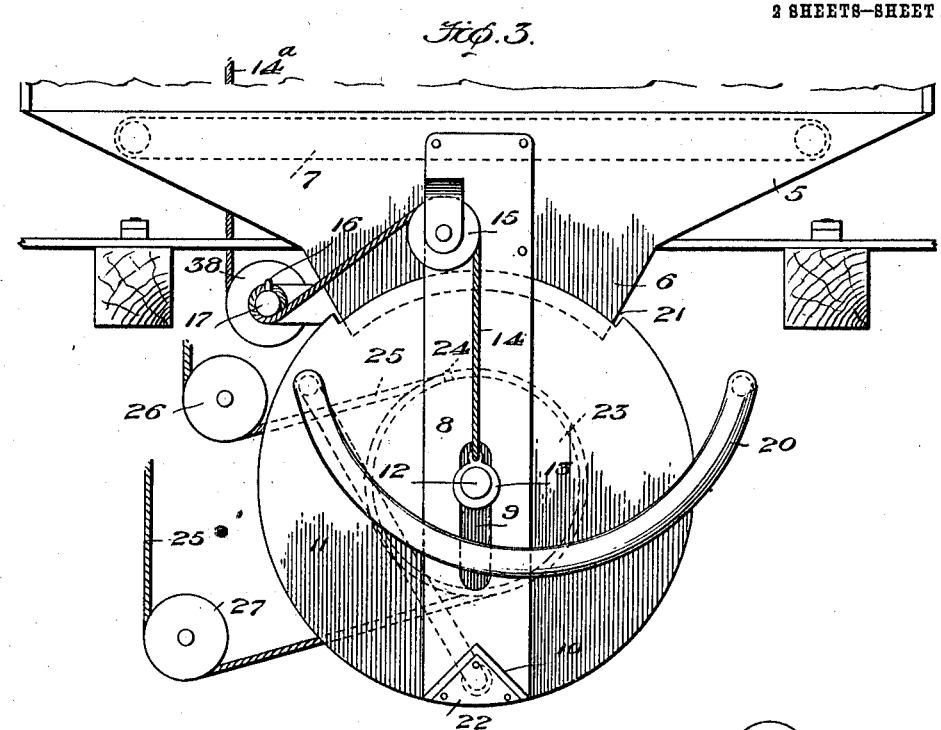

UNITED STATES PATENT OFFICE.

ISAAC A. DAVIS, OF GRAND ISLAND, NEBRASKA, ASSIGNOR OF ONE-HALF TO HANS P. HANSEN, OF GRAND ISLAND, NEBRASKA.

LOCOMOTIVE ASH-PAN.

1,003,992.   Specification of Letters Patent.   Patented Sept. 26, 1911.

Application filed February 20, 1911. Serial No. 609,697.

*To all whom it may concern:*

Be it known that I, ISAAC A. DAVIS, a citizen of the United States, residing at Grand Island, county of Hall, and State of Nebraska, have invented certain new and useful Improvements in Locomotive Ash-Pans, of which the following is a specification.

This invention relates to locomotive ash pans.

The present invention has for its objects the provision of a novel ash pan adapted for quenching the ashes as they fall from the grate and collecting and retaining them for dumping when desired by operation from the fireman's deck of the locomotive whether the engine be in motion or stationary and which will render it unnecessary for the fireman or helper to get under the locomotive to effect cleaning or dumping of the pan.

The invention also has for its object the provision of an ash pan of such novel construction that it is adapted for use in connection with a locomotive of any size or type by effecting minor adaptations and adjustments, and the disclosures hereinafter given in the specification and in the drawings are to be deemed as illustrative, and not restrictive, of the invention.

In carrying out the invention, there is provided a hopper adapted to initially receive the ashes from the grate, together with flooding or sprinkling means for quenching the ashes as they fall thereon, and an oscillating or rotary ash pan or receptacle into which the ashes pass from the hopper, the receptacle or pan being arranged so that it will catch the water and insure the quenching of the ashes, heating means being preferably provided to keep the water in the pan from freezing in cold weather and also an overflow device so that the water will not slop over and by freezing impair the action of the pan. The pan is mounted in a novel manner for rocking or oscillating or, indeed, complete turning, so that its contents may be readily dumped at any time, new means being provided under the convenient control of the fireman on the fireman's deck for turning the pan to dump and restore it, but in its broader aspect, the operating means may be varied and it may be either hand or power operated and checked against accidental operation. The rockable ash pan is arranged for raising and lowering in a new manner so that when in raised receiving position it will be so disposed that the ashes cannot accidentally fail to pass into the pan from the hopper and when the pan is to be dumped, it may be lowered for that purpose.

The foregoing statement of the invention is to be deemed as and for the purpose of setting forth the structure and not in restriction of the scope of the invention.

In the accompanying drawings:—Figure 1 is a longitudinal section showing the invention in use; Fig. 2, a detail view of the winding and locking means for turning the ash pan; Fig. 3, an end elevation taken at the left of Fig. 1; and Figs. 4 and 5, modifications.

The fire-box 1, grate 2 and drivers 3 are of ordinary construction. The oscillating ash pan may be hung above or below the axle 4, the latter being the construction shown.

Depending from the mud ring is a hopper or apron 5 whose ends and sides slope and the lowermost central part thereof is made of trough-shape, as shown at 6, to direct the ashes to the ash pan. Suitably disposed adjacent the hopper are one or more sprinkling or flooding water pipes 7 which may run around the entire interior of the said hopper, and they are provided with apertures or slots for directing the water on the hopper so that the ashes may be quenched prior to their passage into the ash pan to insure the deadening of the ashes.

Depending from the front and rear ends of the hopper 5 are hangers 8 having vertical slots 9 and notched at their lower ends 10.

Extending lengthwise of the locomotive between the hangers 8 is the ash pan 11 which has trunnions 12 passing through the slots 9 and adapted to both turn and slide therein, said trunnions being supported by collars 13 which constitute the bearings therefor, said collars being suspended by chains or cables 14 from idlers 15 suitably journaled in the hangers 8 and brackets connected thereto, the chains or cables thence passing to connectors 16 of suitable construction on an elevating and lowering shaft 17 suitably journaled in hangers below the hopper 5 and extending longitudinally of the latter, the chains or cables being adapted to wind upon the shaft 17 when it is turned to thereby take up or pay out the chains or cables 14 and bring about raising or lowering of the ash pan, the shaft 17 being turned by means presently to be set forth.

The ash pan 11 is of substantially cylindrical construction, being adapted to contain the water which flows from the pipes 7 and is provided with a take-off or overflow 18 which prevents the water from slopping over and thus obviates the formation of ice on the exterior of the parts which would interfere with proper operation in cold weather. For the purpose of preventing the water from freezing in the ash pan, there is provided a steam heating pipe 19 which enters the ash pan at one side of the hangers 8 and has its exit in a similar manner at the other end, said pipe passing to the lower part of the ash pan and longitudinally thereof and being adapted for connection to a flexible hose 20 on any suitable steam pipe, the hose permitting the ash pan to be turned to effect dumping of its contents and restoration of the ash pan to normal position. The ash pan is open at its upper part 21 so that it may telescope, as it were, over the depending part 6 of the hopper, and thus insure the entry of all of the ashes into said pan, and to prevent any accidental turning of the ash pan when in receiving position, there are provided the angle members 22 on the ash pan which are adapted to engage with the notched ends 10 of the hangers 8, but when the chains or cables 14 are paid out, these parts clear each other so that the ash pan may be turned.

Secured to one of the trunnions 12 is a sheave or pulley 23 to which at 24 is connected a chain or cable 25 which passes around this sheave or pulley and thence around idlers 26 and 27, so that when the cable or chain 25 is pulled in one direction, the ash pan will be rocked to dump, and when pulled in the other direction, said ash pan will be restored to normal position.

Different means may be employed for operating the chains or cables 14 and 25, but for economy of space and certainty of operation, as well as for the sake of simplicity and durability, I preferably employ on the fireman's deck, at a suitable height and positioned for convenient operation, a cage 28 of suitable form and strength in which the pulleys 29 and 30 are mounted in separated arrangement on the same axis, the hubs 31 and 32 of the pulleys being, respectively, provided with notches 33 and 34, and mounted to slide lengthwise of these hubs is the stem or shaft 35 of a suitable hand-wheel 36, the shaft being provided with one or more lugs or pins 37 which, according as the shaft 35 is pushed in or pulled out, will engage with the notch 33 or the notch 34, thus coupling one or the other of the pulleys to the said shaft so that it may be operated by the hand-wheel. A cable or chain 14$^a$ which is secured to a sheave or pulley 38 on the shaft 17, is connected to one of the pulleys 29, 30. The cable 25 is passed around the other pulley and secured thereto at 39. Gravity may be relied on to lower the ash pan as the cable 14$^a$ is paid out from the pulley to which it is connected, but for purposes of dumping the ash pan, rocking it in its bearings or collars 13, it is necessary to give it a positive pull in each direction. The pulleys 29, 30 may be locked in different ways to insure retention of the ash pan in raised position and for this purpose teeth 40 may be provided on said pulleys with which pawls 41 engage, which may be released when it is desired to operate the pulleys. A counterweight may be utilized to cause dumping of the ash pan, as shown in Fig. 4, or an air or steam cylinder may be used for this purpose, as shown in Fig. 5.

At 42 there is provided, preferably, a sight tube leading up through the fireman's deck through which he may observe the condition of the hopper and ash pan.

In my copending application, Serial No. 603,605, filed January 19, 1911, I have disclosed another invention on a locomotive ash pan.

Having thus described my invention, what I claim as new and desire to secure by Letters Patent, is:—

1. In a locomotive ash pan, the combination with a hopper adapted to receive the ashes from the grate, of a shiftable and rockable ash pan adapted to receive the ashes from the hopper, means for raising and lowering the ash pan in relation to the hopper, and means for rocking the ash pan.

2. In a locomotive ash pan, the combination with a hopper having a depending part, of an ash pan having a mouth adapted to receive the depending part of the hopper, said ash pan being mounted for raising and lowering and also for rocking, means for raising and lowering the ash pan, whereby it may be positioned to cause the depending part of the hopper to be received in the mouth or to be free for rocking, and means for rocking the ash pan.

3. In a locomotive ash pan, the combination with a hopper adapted to receive the ashes from the grate, of hangers, a rockable ash pan mounted to slide on said hangers, means for raising and lowering the ash pan, and means for rocking said ash pan.

4. In a locomotive ash pan, the combination with a hopper adapted to receive the ashes from the grate, of hangers, a rockable ash pan mounted to slide on said hangers, means for raising and lowering the ash pan, means for rocking said ash pan, and a device for locking the ash pan when it is in position to receive the ashes from the hopper.

5. In a locomotive ash pan, the combination with slotted hangers, of a rockable ash pan having trunnions movable in the slots of the hangers, suspending members in which the trunnions are journaled, means for raising and lowering the suspending members, and means for rocking the ash pan in said suspending members.

6. In a locomotive ash pan, the combination with a hopper having inclined walls, of a rockable ash pan adapted to be raised and lowered and to receive the ashes from the hopper, means for raising and lowering said ash pan, means for rocking the ash pan, and means for flushing the walls of the hopper to quench the ashes therein and to supply water to the said ash pan.

7. In a locomotive ash pan, the combination with a hopper, of a shiftable and rockable ash pan adapted to receive the ashes from the hopper, cables or chains suspending the ash pan and by which it may be raised and lowered, a sheave or pulley connected to the ash pan, a cable or chain connected to the pulley for rocking the ash pan, a sheave or pulley to which said cable is connected, another sheave or pulley, another cable or chain adapted to swing on the last-named sheave or pulley and which is adapted to raise and lower the ash pan, an operating device, and means for clutching the operating device to either of the operating sheaves or pulleys, together with locking means, whereby the ash pan may be held where positioned.

In testimony whereof, I hereunto affix my signature in presence of two witnesses.

ISAAC A. DAVIS.

Witnesses:
 ROSE E. HANSEN,
 ERNEST G. KROGER.

---

Copies of this patent may be obtained for five cents each, by addressing the "Commissioner of Patents, Washington, D. C."